United States Patent
Henning et al.

(10) Patent No.: US 8,622,008 B2
(45) Date of Patent: *Jan. 7, 2014

(54) CONTROLLED SPACING HIGH DENSITY SERPENTINE WAVE PLANTING METHOD AND DEVICES TO ACCOMPLISH THE METHOD AND FARMING BUSINESS METHODS

(76) Inventors: Steven A Henning, Anderson, IN (US); Robert J Pensec, Anderson, IN (US); Jerry M Stires, Anderson, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/586,107

(22) Filed: Aug. 15, 2012

(65) Prior Publication Data

US 2012/0312208 A1    Dec. 13, 2012

Related U.S. Application Data

(62) Division of application No. 12/537,998, filed on Aug. 7, 2009, now Pat. No. 8,275,627.

(60) Provisional application No. 61/188,411, filed on Aug. 8, 2008.

(51) Int. Cl.
*A01C 19/00*    (2006.01)

(52) U.S. Cl.
USPC ............. 111/69; 111/164; 111/200; 172/102; 701/50

(58) Field of Classification Search
USPC ............... 111/200, 120, 11, 61, 69, 157, 149, 111/900, 921, 163–169, 121; 172/110, 101, 172/102; 239/160–162, 166, 230; 705/1.1, 705/500; 701/50
See application file for complete search history.

(56) References Cited

U.S. PATENT DOCUMENTS

| | | | |
|---|---|---|---|
| 4,030,428 A | 6/1977 | Truax | |
| 4,031,962 A | 6/1977 | Ellinger | |
| 4,084,522 A | 4/1978 | Younger | |
| 4,587,909 A | 5/1986 | Bailey | |
| 4,811,795 A | 3/1989 | Dean et al. | |
| 4,989,524 A | 2/1991 | Brown et al. | |
| 5,323,720 A | 6/1994 | Moore, Jr. | |
| 5,511,499 A * | 4/1996 | Edinger | ........................ 111/200 |
| 5,740,746 A | 4/1998 | Leddermann | |
| 6,386,125 B1 | 5/2002 | Gentilhomme et al. | |
| 6,651,569 B2 | 11/2003 | Audigie | |
| 6,994,039 B1 | 2/2006 | Beck | |
| 7,357,087 B2 | 4/2008 | Wilson | |
| 8,275,627 B2 * | 9/2012 | Henning et al. | ............... 705/1.1 |

* cited by examiner

*Primary Examiner* — Christopher J Novosad
(74) *Attorney, Agent, or Firm* — John D. Ritchison

(57) ABSTRACT

A method of seed planting in a "serpentine" pattern called the wave planter is demonstrated. It consists of a manner of placing the seeds that essentially results in equally spaced rows of seeds placed in a serpentine-like layout or wave instead of a straight row. The preferred method creates a wave pattern equidistant from the next, yet creates a substantial increase over the density of straight row planting devices and drills (e.g. parallel, essentially straight rows). The use of the wave pattern provide concrete and substantial benefits to the business and economics of farming through labor, energy, and maintenance savings over current planting methods which results in a new farming business method. The method may be accomplished by several devices. Some of the devices include an oscillating draw bar planter; oscillating tongue planter; elliptical row opener; steerable undercarriage for the planter and castor row openers under undercarriage.

6 Claims, 18 Drawing Sheets

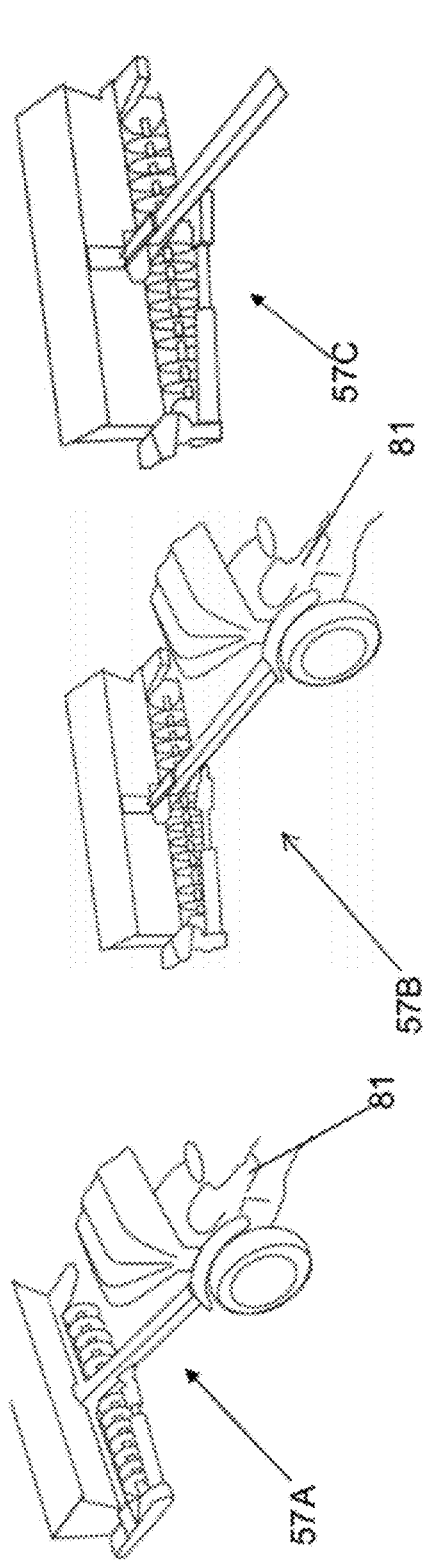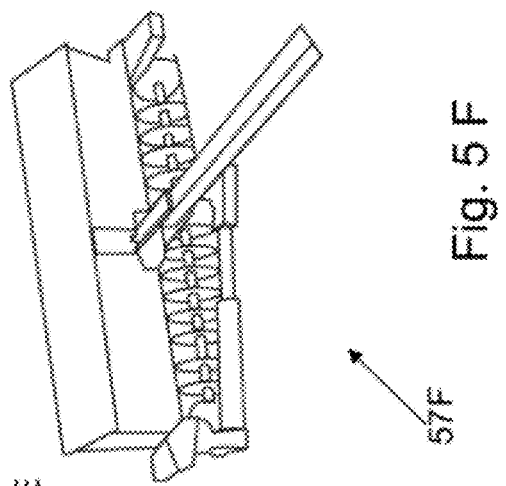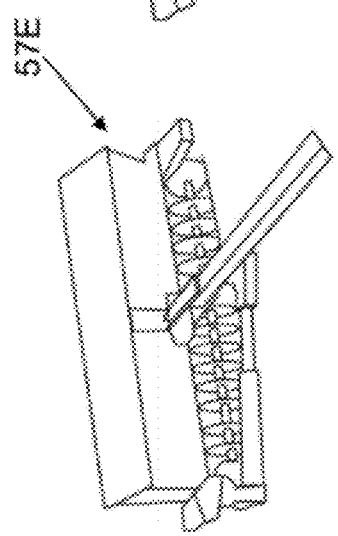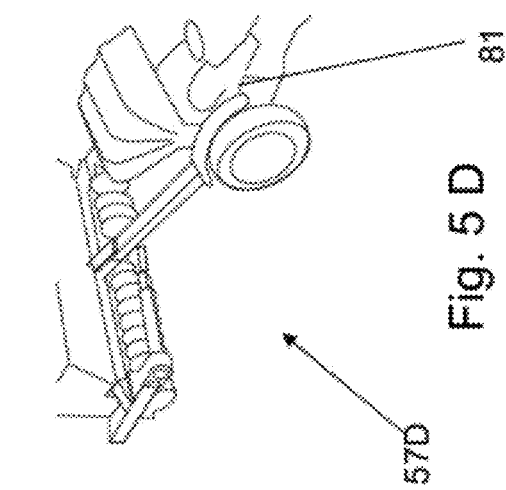
Figs. 5

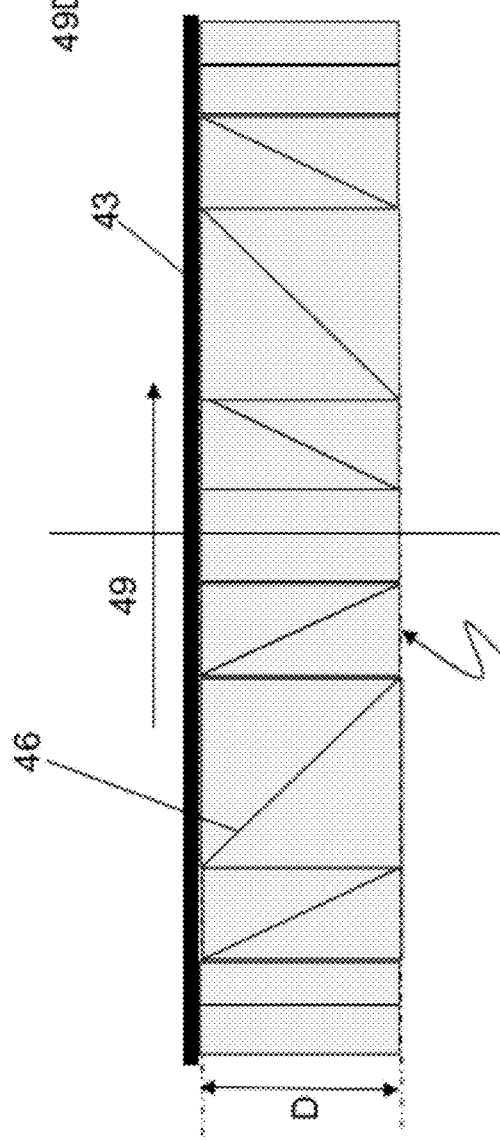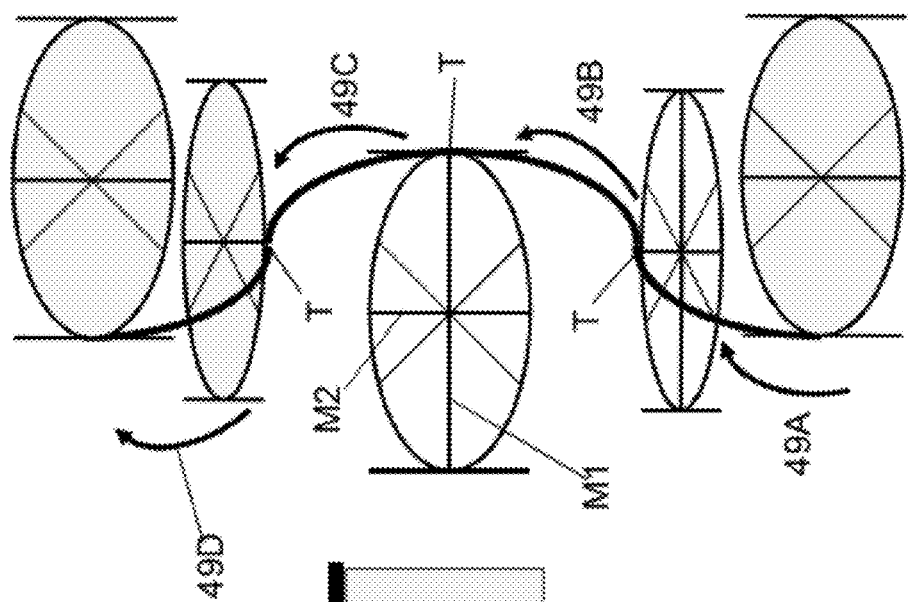
Figs. 8
Fig. 8A
Fig. 8B

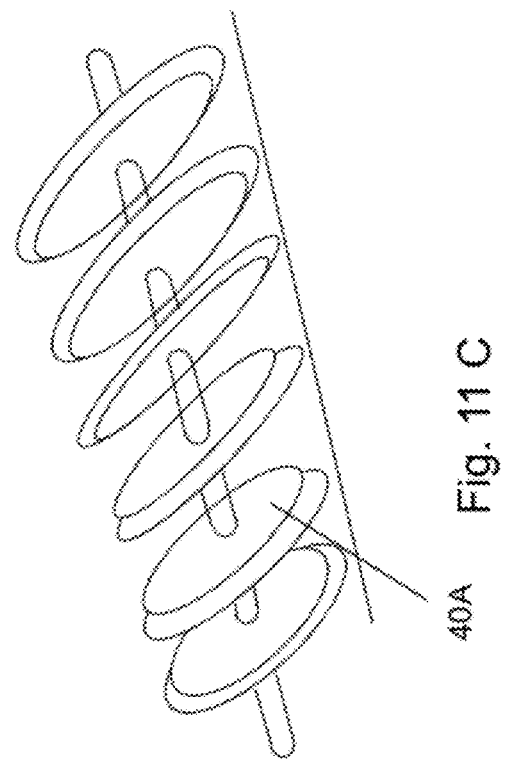
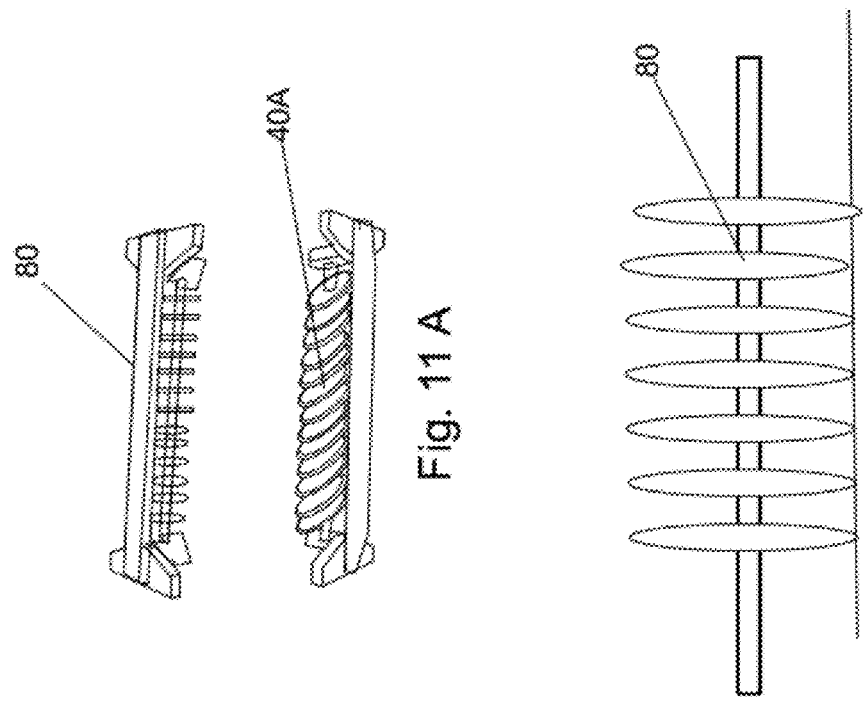
Figs. 11

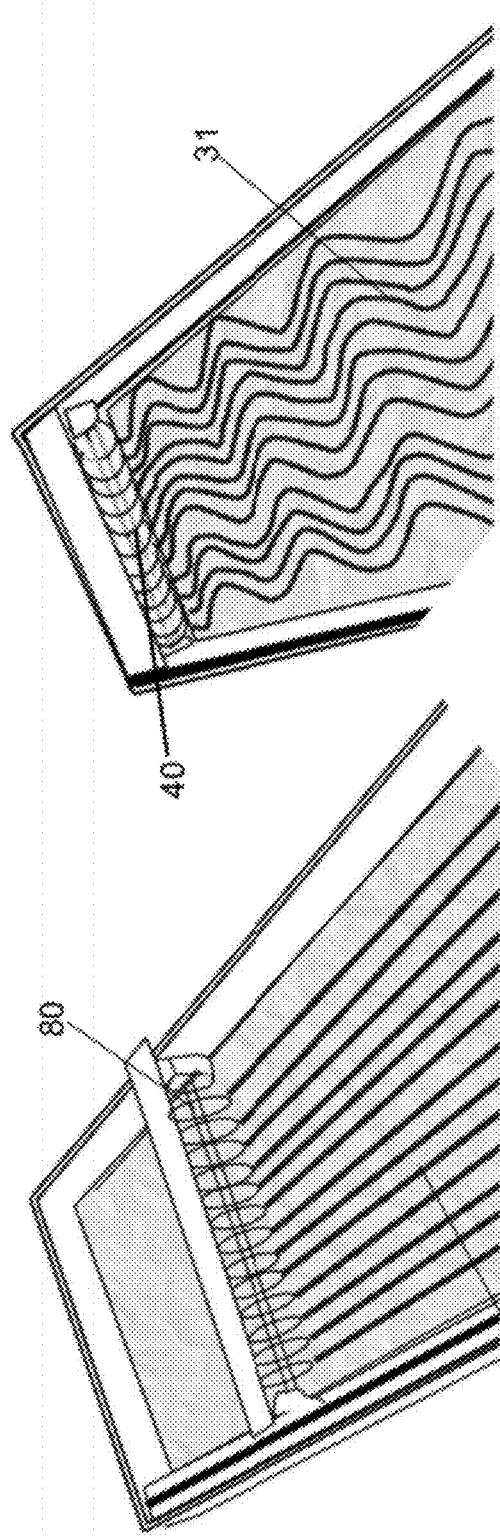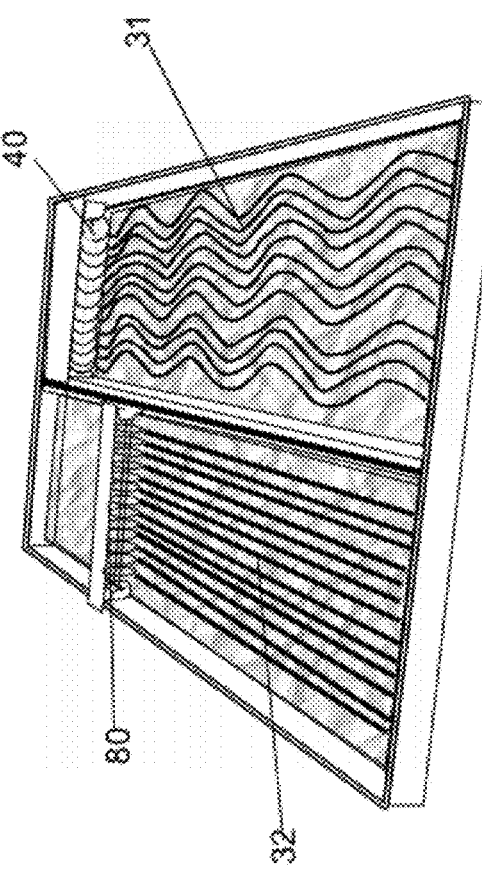
Figs. 12

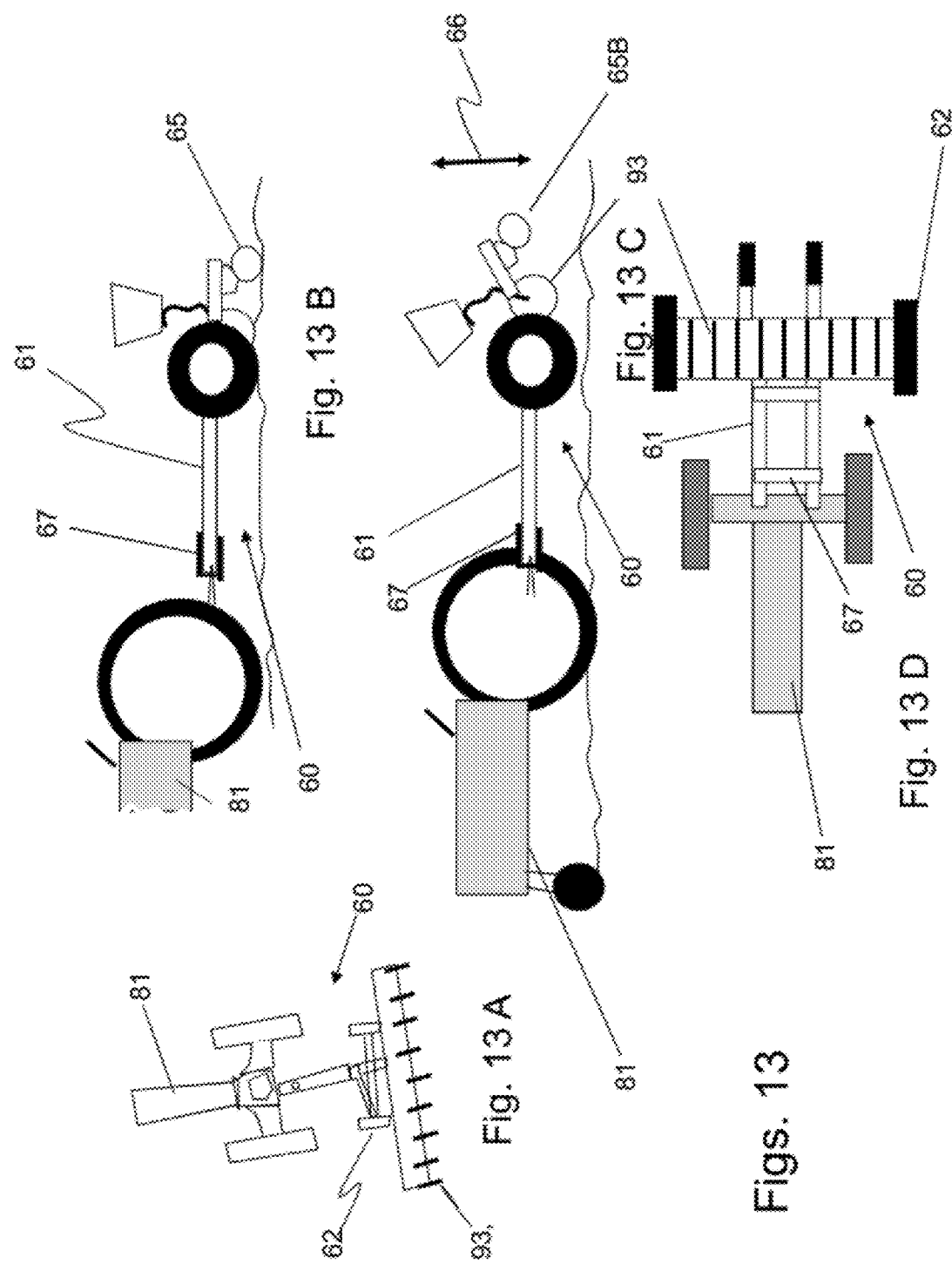

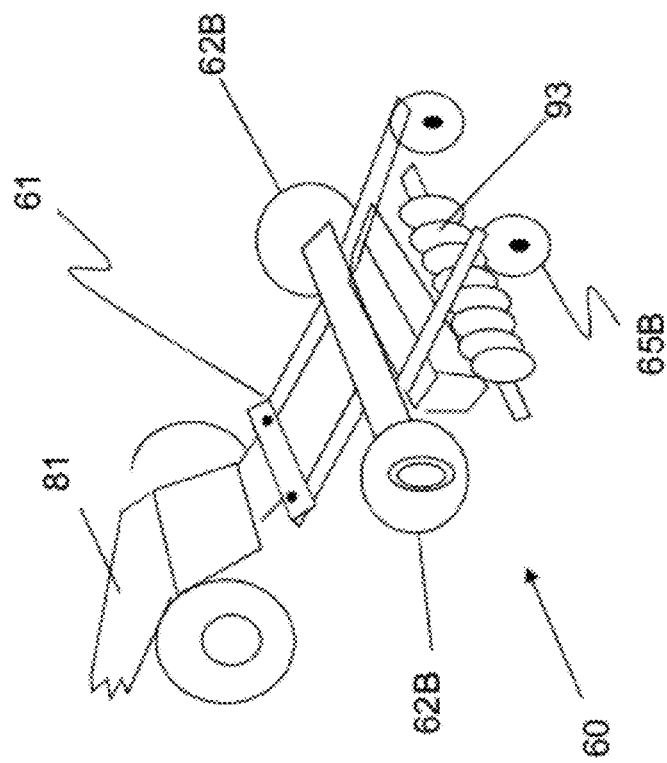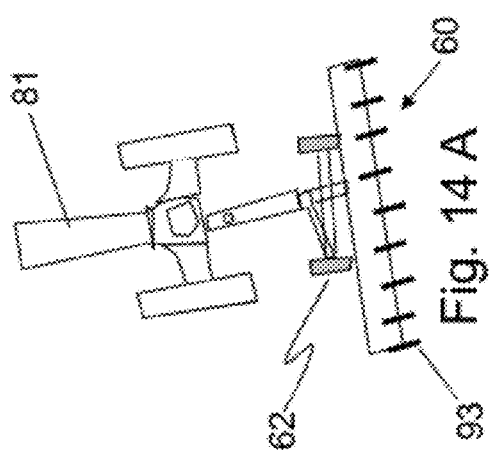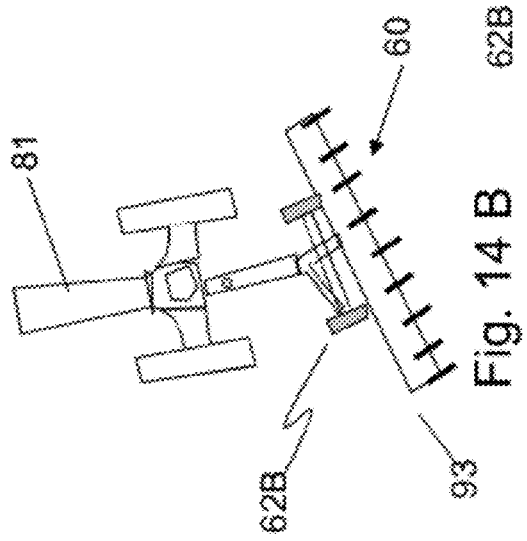

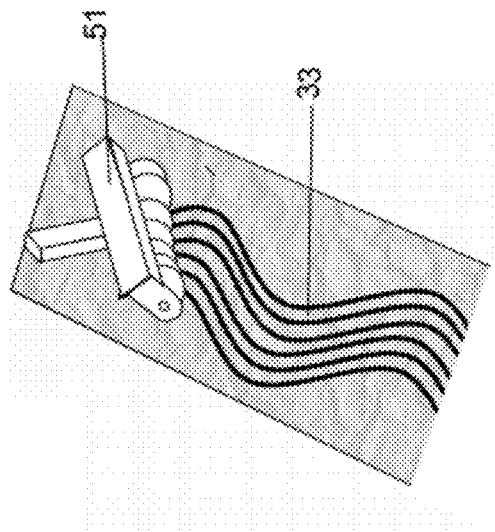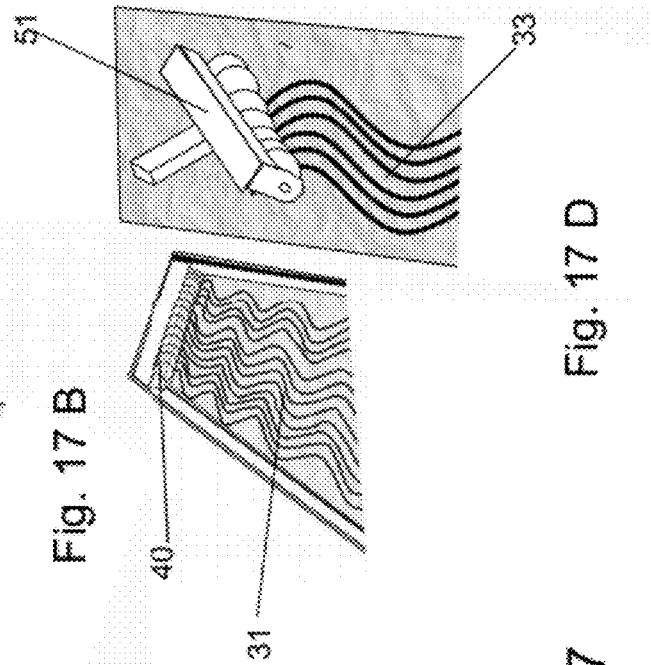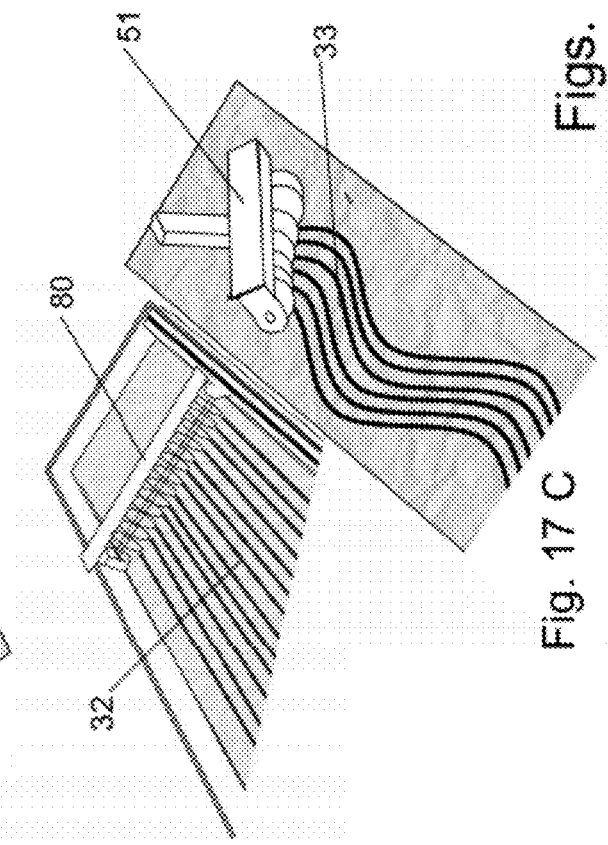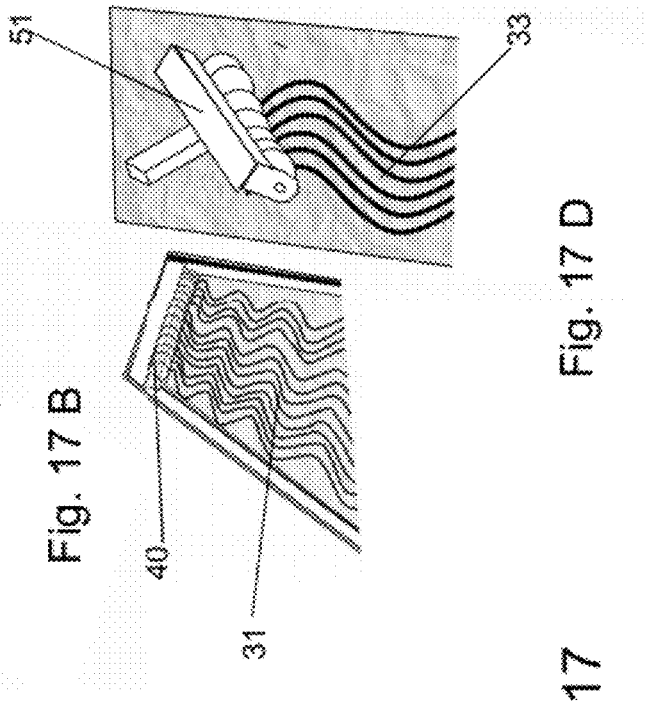
Figs. 17

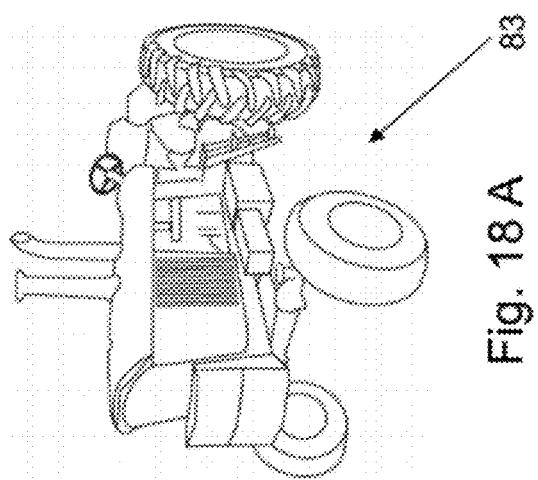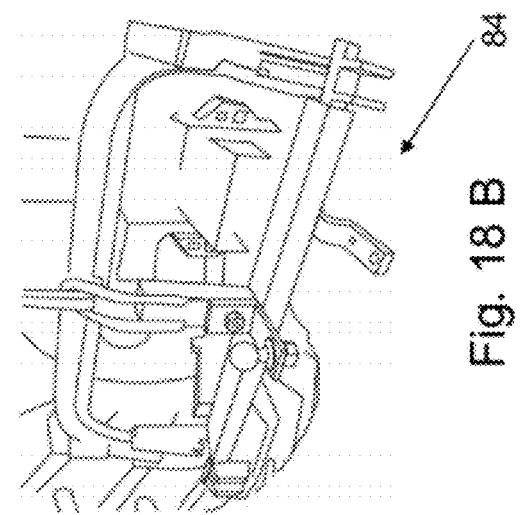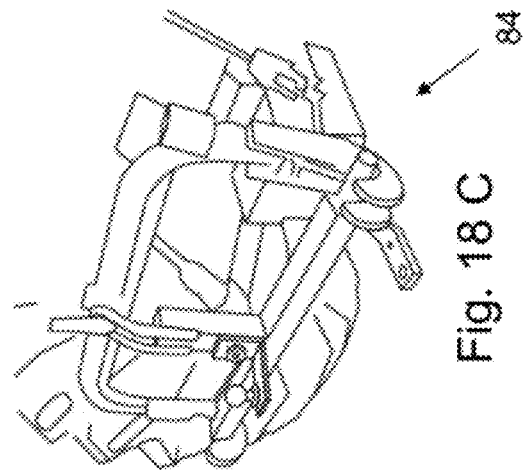
Figs. 18

CONTROLLED SPACING HIGH DENSITY SERPENTINE WAVE PLANTING METHOD AND DEVICES TO ACCOMPLISH THE METHOD AND FARMING BUSINESS METHODS

CROSS-REFERENCE TO RELATED APPLICATIONS

The present application is a divisional of co-pending U.S. patent application Ser. No. 12/537,998, filed Aug. 7, 2009, which claims the benefit of U.S. Provisional Application No. 61/188,411 filed Aug. 8, 2008 by Steven A. Henning and Steven A. Henning, Jr. (and entitled "Controlled Spacing, High Density 'Serpentine' Wave Planting Method; example devices to accomplish the method; and farming business methods") the content of both applications which are incorporated herein by reference in their entirety.

FIELD OF INVENTION

This seed planting method and devices to accomplish relate to a special way to plant agricultural products such as soybeans, corn, rye, wheat and other similar produce that can benefit from a controlled spacing, high density planting. The method called a "serpentine" wave planting method and system is a new combination of existing and new machinery configured with unique features that provide an effective, practical and economical way to provide a device to plant high density rows of seeds. The preferred method creates a wave pattern equidistant from the next, yet creates a substantial increase over the density of straight row planting devices and drills—eg parallel, essentially straight rows. The preferred machinery embodiment is an oscillating drawbar device that can easily and economically be used with present-day farming equipment with little modification. Other alternative embodiments of the machinery are also presented for consideration in providing the new wave method planting. Of paramount or at least equal importance is the benefit to the business of farming. The use of the wave pattern provide concrete and substantial benefits to the business and economics of farming through labor, energy, maintenance savings over current planting methods. Hence a new farming business method is achieved.

FEDERALLY SPONSORED RESEARCH

None.

SEQUENCE LISTING OR PROGRAM

None.

BACKGROUND

Field of Invention and Prior Art

A. Introduction of the Problems Addressed

For hundreds of years it has been a standard practice in the farming community to plant seed in essentially straight rows. However, planting in the newly conceived wave planting called "serpentine" has many advantages over the conventional accepted methods now in use. The wave planting devices permit the seed to be planted in a wave pattern but with a fully controlled spacing. This permits high density, but no deprivation or robbing of the nutrients, moisture or sunlight from adjoining plants. This method gives the ability to significantly increase the Leaf Area Index (LAI) as well as increase the overall crop density in a very well controlled manner.

Wave planting is much different from "broadcasting" or "airborne" applications in that multiple seeds do not lodge into adjoining seeds and compete for space, nutrients, moisture and sunlight—hence preventing some seeds from fully developing and germinating into healthy plants. Wave planting has parallel rows and leave the serpentine foot print as the row openers move through the soil. Additionally, this method may be used, for example and not limitation, on 7 inch, 14 inch, 22 inch centers etc. so that various seed planting benefit from the method.

Higher production with less fuel, labor, land use and equipment maintenance (all equating to cost savings) provide substantial opportunities for this new wave method to help the overall business method associated with farming.

B. Prior Art

Examples of prior devices include U.S. Pat. No. 4,030,428 issued to Truax (1977) and entitled "Native grass seed drill". This invention teaches a device which is a grass seed drill particularly adapted for the planting of native grass type seeds which are characterized by a low density, irregular length and shape, and having a propensity to stick together. The method or devices contemplated and taught by the wave planter are not anticipated. Another example of art is shown by Ellinger in U.S. Pat. No. 4,031,962 (1977) and entitled "Farm implement positioner". It is a positioner for automatically positioning a farm implement, such as a sugar beet harvester, in line with rows of crops such as sugar beets and for automatically maintaining the height of the implement relative to the ground surface. No method or means of wave planting is anticipated.

Younger in U.S. Pat. No. 4,084,522 (1978) shows a device entitled "Apparatus and method for sowing second crop in standing crop". It teaches a device by which seeds of a second crop (e.g. soybeans) are sown in a standing grain crop (e.g. wheat). When the grain crop is ripe it is harvested by cutting with a combine at a level slightly above the top of the partially grown second crop. Seeding of the second crop is performed using a self-driven, preferably three-wheel vehicle carrying a grain drill box having flexible tubes which fit between the rows of grain and each of which discharges the seed into a gap between two downward-inward slanted discs which first cut a slit in the ground, then deposit the seed and finally cover the slit. The discs are supported and their depth controlled in such manner as to cause minimum interference with the grain. This invention relates to a new and improved apparatus and method for sowing a second crop in standing grain. No wave planting and resulting density o the same crop is taught.

A series of patents show planting drills for seed planting. These include: Bailey in U.S. Pat. No. 4,587,909 (1986) and entitled "Agricultural drills"; Dean et al in U.S. Pat. No. 4,811,795 (1989) and entitled "Seed drills"; Brown et al in U.S. Pat. No. 4,989,524 (1991) and entitled "Dibber drills"; Gentilhomme et al. in U.S. Pat. No. 6,386,125 (2002) and entitled "Seed drill"; Audigie in U.S. Pat. No. 6,651,569 (2003) and entitled "Seed drill"; and, Wilson in U.S. Pat. No. 7,357,087 (2008) and entitled "Grain drill with accurate metering of the rate of planting of seed". All showed various seed drills with features, yet none showed or anticipated the wave planting method and device.

A further example of planter is shown by Moore, Jr. in U.S. Pat. No. 5,323,720 (1994) and entitled "Revegetation method". This teaches a method where mined lands are reseeded by dispensing grass, forb and shrub seed from a seed drill with seed-dispensing boxes connected to plural dispensing tubes which drop seed on the earth's surface and wherein at least one seed box is operable to dispense cool season grass seed through conventional opener assemblies into furrows formed thereby. No use with crops and wave planting is anticipated.

Another recent example of a planter system is demonstrated by Ledermann, et al. in U.S. Pat. No. 5,740,746 (1998) and entitled "Seed material dispensing system for an agricultural planter". This teaches a particulate matter or seed dispensing system for an agricultural implement having a mobile frame with a plurality of row units mounted to the frame. The seed dispensing system includes an upright storage hopper that is adapted to be carried by the frame and has the capacity for holding a large quantity of particulate matter such as seed. A bin is adapted to be carried on each row unit for holding a quantity of particulate matter or seed. Notably, each bin holds substantially less than the quantity of particulate matter adapted to be held in the storage hopper. A metering unit is adapted to be arranged on each row unit proximate a furrow opener of the row unit. The metering unit is arranged in material receiving relation relative to a respective bin on each row unit. The dispensing system of the present invention further includes an apparatus for delivering particulate matter from the hopp. No wave pattern is suggested or anticipated.

Finally, a recent example of another planter system is demonstrated by Beck, in U.S. Pat. No. 6,994,039 (2006) and entitled "Bulk seed handling and dispensing system". This teaches a bulk seed handler and dispenser is provided for transporting bulk seed containers and for dispensing the seed within the containers into planting equipment. The bulk seed handler and dispenser is comprised of a trailer having a plurality of bulk seed containers mounted thereon, each of which is in communication with individual hoppers. A horizontally disposed conveyor auger is in communication with each of the hoppers and is adapted to convey the seed from the hoppers to a transition box located at the forward end of the conveyor auger. A seed discharge auger has its lower end in communication with the transition box and extends upwardly and laterally therefrom. A discharge tube is connected to the upper end of the seed discharge auger which is maneuvered for placement adjacent planter unit hoppers. The density achieved by the wave planner device is not anticipated.

The particular combinations of materials and features are unique and novel and are not anticipated by prior art. Likewise, use of the "serpentine" method with the example devices provides significant benefits compared to prior art planting devices. As far as known, there is no other wave planting methods or devices to accomplish this "serpentine" pattern of high density, controlled spacing seed planting. It is believed that this method and related devices are made with fewer parts with improved configurations and physical features to provide more functionality when compared to other currently planting devices or methods for seed planting or drilling.

SUMMARY OF THE INVENTION

A new method of seed planting in a wave pattern called the "serpentine" has been developed. It consists of essentially equally spaced rows that are placed in a serpentine like lay out or wave instead of a traditional straight row. It may be accomplished by several machines and devices. For example and not limitation, some of the devices are summarized as follows. A complete description is below with the Detailed Description.

TABLE A

Example wave making planting devices.

| Item | Name | Description |
|---|---|---|
| 1 | Oscillating Draw Bar planter | Means such as a cylinder is on the tractor and controls the drawbar in a back and forth - lateral movement. A standard round disc planter with traditional row openers follows the tractor and forms a wave pattern |
| 2 | Oscillating Tongue planter | Means such as a cylinder is on the disc planter and controls the tongue in a back and forth - lateral movement. A standard round disc planter with traditional row openers follows the tongue movement and forms a wave pattern |
| 3 | Elliptical Row opener | Elliptical row opener as an ellipse shape and on a set angle to the frame. Ellipse moves across ground and deposits seed in a wave pattern |
| 4 | Steerable Undercarriage | Secure parallel linkage from draw bar to round disc row openers. Undercarriage fitted with steerable means such as tires and a turning mechanism. After the planter system a set of retractable wheels that permit the whole planter to be raised and lowered at row ends, for example. |
| 5 | Castor row openers under undercarriage | Castor mounted row openers are mounted to frame which is follows a tractor fitted with a parallel structure to draw bar. Row openers turn in a wave as the planter is moved laterally side to side by the drawbar |

The use of the wave pattern provide concrete and substantial benefits to the business and economics of farming through better land use and labor, energy, maintenance savings over current planting methods. Hence a new farming business method is achieved.

The preferred embodiment of wave producing machine is comprised of a means to produce lateral movement such as a cylinder and control system; a means to moveably secure the means for lateral movement to a pulling vehicle such as a tractor or the like; a moveable drawbar means secured to the cylinder and the tractor; a planting device comprised of at least one row opener; and a means to connect the drawbar to the planter device and row openers.

OBJECTS AND ADVANTAGES

There are several objects and advantages of the new wave planting method, the devices and the business methods achieved with this invention. The following TABLE B summarizes various advantages and objects of the methods and devices. This list is exemplary and not limiting to the many advantages offered by this new device.

TABLE B

Various Benefits, Advantages and Objects
This device:

| ITEM | BENEFIT |
|---|---|
| 1. | Increases planting density and use of space |
| 2. | Provides Equal and predetermined spacing of seeds |

TABLE B-continued

Various Benefits, Advantages and Objects
This device:

| ITEM | BENEFIT |
|---|---|
|  | to eliminate deprivation of nutrients, moisture and sunlight from adjoining plants |
| 3. | Reduces and eliminates deprivation of nutrients, moisture and sunlight from adjoining plants |
| 4. | Is easy to use |
| 5. | Reduces fuel requirements for production attained |
| 6. | Is faster than other methods |
| 7. | Is consistent |
| 8. | Reduces labor requirements for production attained |
| 9. | Reduces maintenance of equipment requirements for production attained |
| 10. | Improves overall business methods in farming by significantly increasing yield and reducing costs per acre of land farmed |

Noteworthy is that other advantages and additional features of the present wave planter method, devices and farming business methods will be more apparent from the accompanying drawings and from the full description of the device. For one skilled in the art of farming and agricultural methods and machinery, it is readily understood that the features shown in the examples with these methods and devices are readily adapted for improvement to other types of methods, mechanisms and devices for use with the farming industry in general and the planting methods in particular.

DESCRIPTION OF THE DRAWINGS

Figures

The accompanying drawings, which are incorporated in and constitute a part of this specification, illustrate a preferred and alternative embodiments for the Controlled Spacing, High Density "Serpentine" Wave Planting Method; example devices to accomplish the method; and farming business methods. The drawings together with the summary description given above and a detailed description given below serve to explain the principles of the methods and devices for wave planting. It is understood, however, that the device is not limited to only the precise arrangements and instrumentalities shown.

FIGS. 1 B through 1 D are example devices used to achieve the wave.

FIG. 4 G is an example of the wave planting results.

FIGS. 5 A through 5 F are simulated steps in using the model oscillating tongue device behind a pulling force to permit oscillating wave planting.

FIGS. 8 A and 8 B are sketches of the elliptical disc planter and the change of the elliptical disc and the movement of the tangent as well as the major and minor axes.

FIGS. 11 A through 11 C prototype sketches of straight disc and elliptical disc row openers.

FIGS. 12 A through 12 C example results for straight disc planters and elliptical disc planters.

FIGS. 13 A through 13 D are sketches of the steerable undercarriage wave planting device.

FIGS. 14 A through 14 C are concept sketches of the steerable undercarriage wave planting device.

FIGS. 17 A through 17 D are simulations of the planting results from a straight row opener, oscillating and elliptical row opener planting devices.

FIGS. 18 A through 18 C are sketches of a tractor from different views for reference to current art.

REFERENCE NUMERALS

Figure 1:
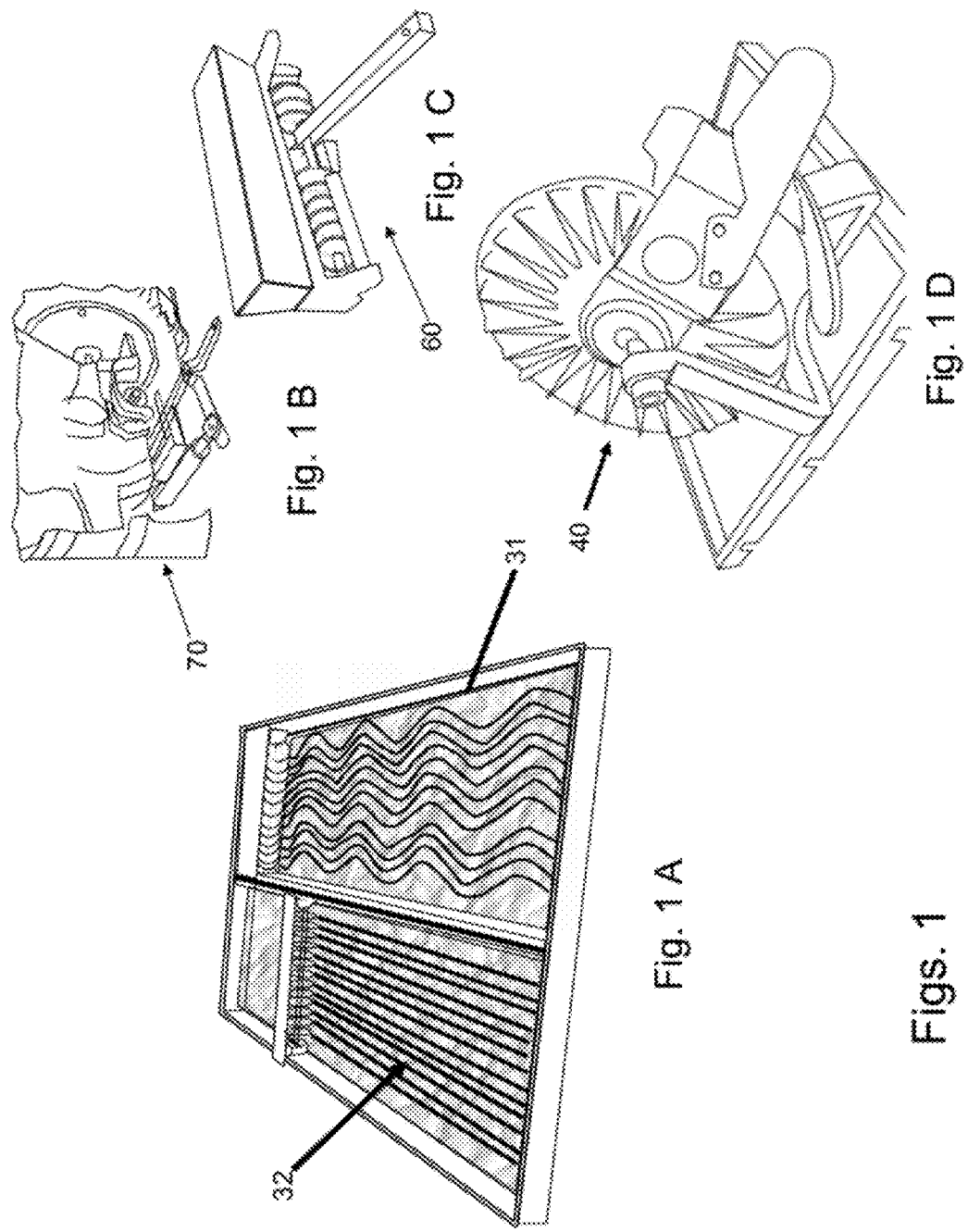
FIG. 1 A is the new wave method planting system illustrated beside traditional straight row drill planting.

The following list refers to the drawings:

TABLE C

Reference numbers

| Ref # | Description |
|---|---|
| 31 | Wave planting footprint - ELLIPTICAL DISC |
| 32 | Straight planting footprint |
| 33 | Wave planting footprint - OSCILLATING DRAWBAR OR TONGUE |
| 34 | Wave planting footprint - other devices |
| 40 | Model of elliptical disc planting device |
| 40A | Sketches of elliptical disc device |
| 41 | Seed chute acceptor means |
| 42 | Frame (possibly inverted) for an elliptical disc |
| 43 | Carrying/support shaft |
| 43A | Center point of elliptical disc |
| 43B | Shaft support means such as a bearing or bushing, etc |
| 44 | Aperture for shaft |
| 45 | Wave structure for row opener |
| 46 | Row opener "Plane" |
| 47 | Model splines to depict row opener waves |
| 48 | Cover means |
| 49 | Movement across ground/field |
| 49A-E | General movement of elliptical disc |
| 50 | Oscillating tongue wave planter device |
| 51 | Seed receptacle |
| 52 | Typical round row openers (discs) |
| 53 | tongue |
| 54 | Means to oscillate tongue such as a cylinder or other drive system |
| 55A to F | Oscillating tongue device intermediate positions |
| 57A to F | Simulated pull of Oscillating tongue device intermediate positions |
| 60 | Steerable wave planter device |
| 61 | Parallel hitch bar |
| 62 | Steerable Tires/wheels in straight position |
| 62B | Steerable Tires/wheels in turned position |
| 65 | Lift Tires/wheels in down position |
| 65B | Lift Tires/wheels in up position |
| 66 | Up-Down motion |
| 67 | Mounting brackets |
| 70 | Oscillating drawbar wave planter device |
| 71 | Oscillating drive such as a cylinder or the like |
| 72 | Drive linkage |
| 73 | Pivot of drive linkage at cylinder |
| 74 | Pivot of drive linkage at drawbar |

TABLE C-continued

Reference numbers

| Ref # | Description |
|---|---|
| 75 | Drawbar |
| 76 | Side to side Oscillation movement |
| 80 | Straight planting disc means - essentially a row drill set at a pre-decided width between circular row openers |
| 81 | Pulling means such as a tractor, truck, other suitable vehicle or mechanized system |
| 83 | Current tractor device as reference to prior art |
| 84 | Rear view of tractor to show working mechanisms for reference |
| 90 | Oscillating carriage wave planter device with castor type row openers |
| 91 | Carrying structure |
| 92 | Model Oscillating carriage wave planter device with castor type row openers |
| 93 | Castor type row openers |
| 94 | seeds |
| 95 | Ground/field |
| Φ | Angle frame to disc shaft |
| D | Equidistance ground to elliptical planter shaft |
| α | Relative disc angle to ground/horizon |
| X | Minimum Distance on castor type planter |

DETAILED DESCRIPTION OF PREFERRED EMBODIMENT

The interconnected inventions presented are Controlled Spacing, High Density "Serpentine" Wave Planting Method; example devices to accomplish the method; and farming business methods. These methods and devices relate to a new method to increase plant density while controlling spacing. This method and use of these devices prevent deprivation of nutrients, moisture and sunlight from adjoining plants and increases the Leaf Area Index of the plants. Improvements from labor savings, fuel savings, maintenance reduction and crop yield per acre provide concrete financial gains in this method of doing farming business with wave planting.

Examples of alternative embodiments of the devices are:

| | |
|---|---|
| 1 | Oscillating Draw Bar planter |
| 2 | Oscillating Tongue planter |
| 3 | Elliptical Row opener |
| 4 | Steerable Undercarriage |
| 5 | Castor row openers under undercarriage |

The preferred embodiment of wave producing machine is comprised of a means to produce lateral movement of the draw bar such as a cylinder and control system; a means to moveably secure the means for lateral movement to a pulling vehicle such as a tractor or the like; a moveable drawbar means secured to the cylinder and the tractor; a planting device comprised of at least one row opener; and a means to connect the drawbar to the planter device and row openers.

There is shown in FIGS. 1-18 a complete detail and operative embodiment of the Controlled Spacing, High Density "Serpentine" Wave Planting Method; example devices to accomplish the method; and farming business methods. In the drawings and illustrations, one notes well that the FIGS. 1 through 5, 7, and 10 through 18 detail the special configuration and descriptions. FIGS. 4, 5, 6, 8, 9, 12, 15 and 17 describe more of the operation. FIG. 18 show some prior art in the farming industry as reference.

The advantages and benefits for the Controlled Spacing, High Density "Serpentine" Wave Planting Method; example devices to accomplish the method; and farming business methods are:

Increases planting density and use of space
Provides Equal and predetermined spacing of seeds to eliminate deprivation of nutrients, moisture and sunlight from adjoining plants
Reduces and eliminates deprivation of nutrients, moisture and sunlight from adjoining plants
Is easy to use
Reduces fuel requirements for production attained
Is faster than other methods
Is consistent
Reduces labor requirements for production attained
Reduces maintenance of equipment requirements for production attained
Improves overall business methods in farming by significantly increasing yield and reducing costs per acre of land farmed The preferred embodiment of wave producing machine 70 is comprised of a means to produce lateral movement of the draw bar 71 such as a cylinder and control system; a means to moveably secure the means for lateral movement to a pulling vehicle such as a tractor 81 or the like; a moveable drawbar means 72-74 secured to the cylinder and the tractor; a planting device 80, 60, 90 comprised of at least one row opener; and a means to connect the drawbar to the planter device and row openers.

FIG. 1 A is the new wave method planting system illustrated 31 beside traditional straight row 32 drill planting. The wave method planting is a serpentine-like movement of the row openers through the soil. This method has been developed for the specific use in planting seeds in a serpentine row, also defined as winding, wave, resembling a snake, curving, meandering, twisting or bending. One of many devices may be used. These devices shall deposit seeds with the correct spacing according to the individual plant requirements. For example, corn is planted normally wider than soybeans, etc. The wave planting method works for various seeds such as but not limited to corn, beans, wheat, oats, rye, etc. The rows shall be parallel to each other. This method will put rows into the soil that are equally spaced apart so there will be no root encroachment or one seed stealing the space, sunlight, moisture or nutrients from other seeds. Various devices may be used to accomplish a wave planting method. FIGS. 1 B through 1 D are example devices used to achieve the wave. An oscillating drawbar wave planting device 70 is shown in FIG. 1 B. An oscillating tongue wave planting device 50 is shown in FIG. 1 C and an elliptical disc row opener 40 is shown in FIG. 1 D. All are described below in further detail.

Figure 2:
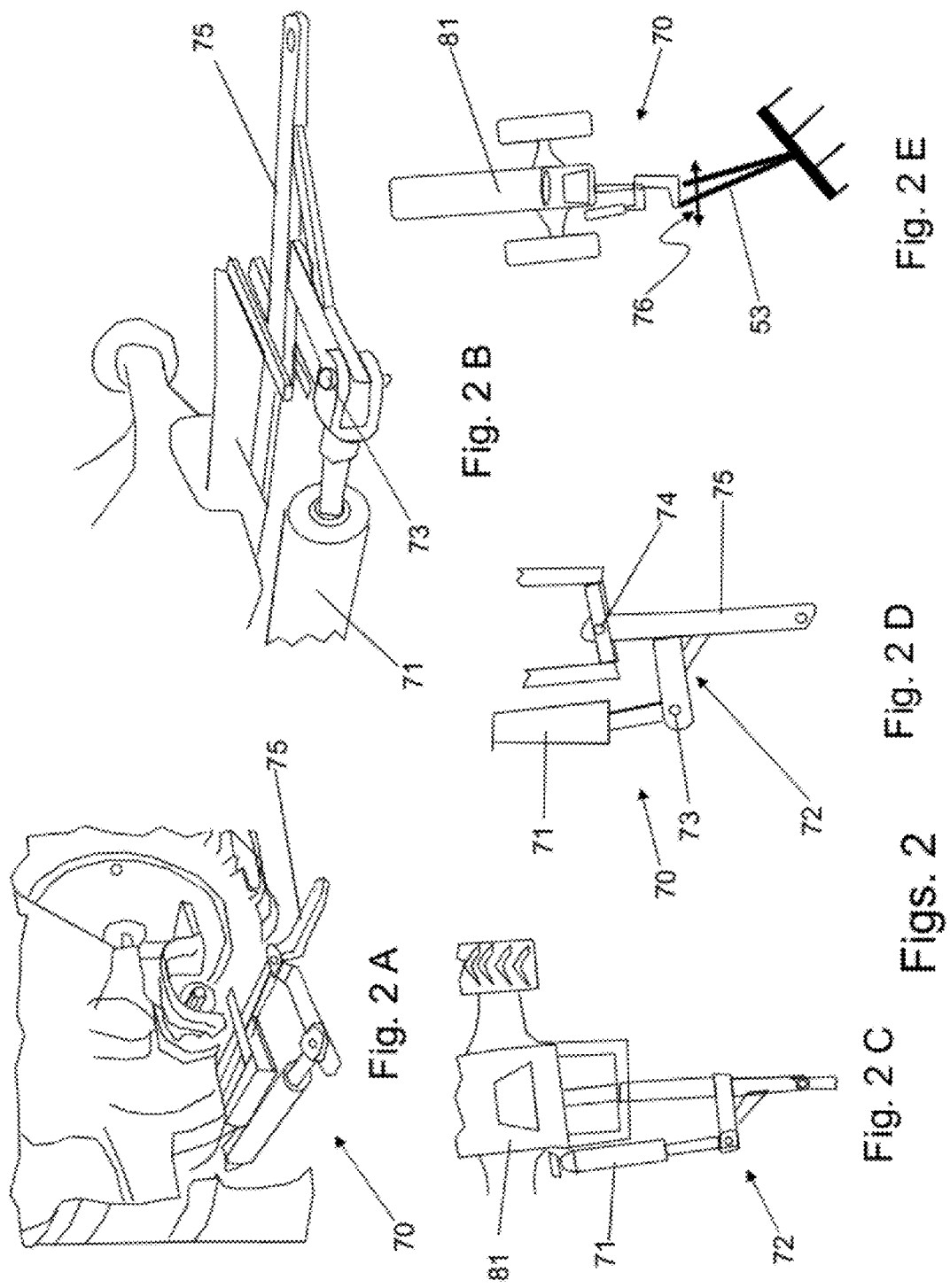
FIGS. 2 A through 2 E are sketches of the oscillating drawbar device to create a wave planting method.

FIGS. 2 A through 2 E are sketches of the oscillating drawbar device 70 to create a wave planting method 31. This device 70 attaches directly to the tractor 81 three point system or be mounted to the tractor frame 72-74. The device 70 is actuated by using a means 71 such as an hydraulic cylinder, an hydraulic motor, PTO (Power Take Off), ground driven or other means. The purpose of the device 70 is to transmit a force directly to the drawbar 75 that results in a side to side movement 76. A planting device or implement 80, 90 is then directly attached to the drawbar 75 by its tongue 53 which follows the movement 76 of the drawbar 75. As the drawbar 75 moves side to side 76, the planter/implement 80, 60, 90 follows the motion and creates the wave planting footprint 33 and pattern. Most existing farm equipment could be easily adapted to this device and configuration.

Figure 3:
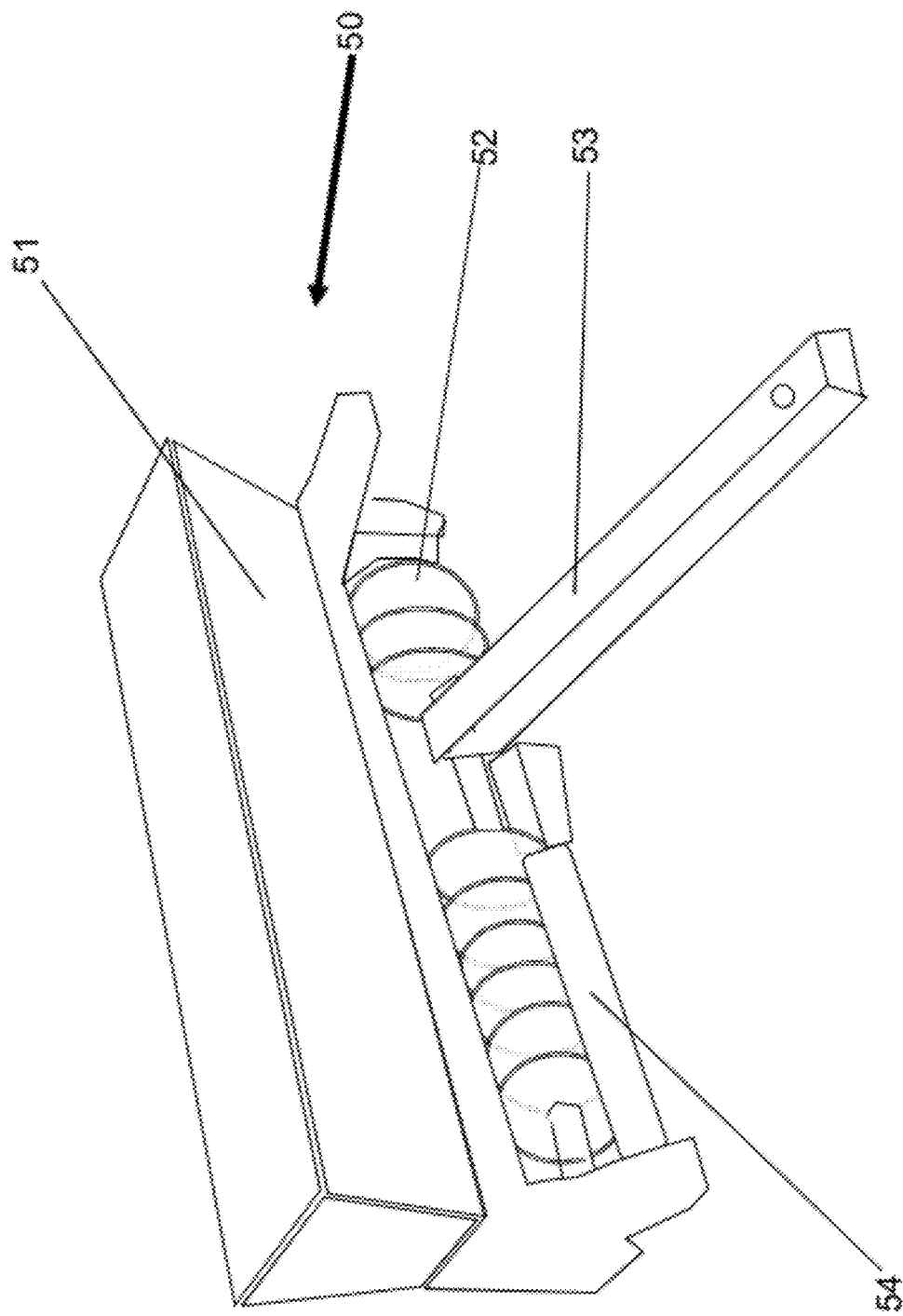
FIG. 3 is a typical model oscillating tongue device to permit wave planting.

FIG. 3 is a typical model oscillating tongue device 50 to permit wave planting 33. Here the seed receptacle 51 sits above a standard set of round row openers 52. The tongue 53 has a control means (not shown) that engages a means to oscillate 54 (such as an hydraulic cylinder, an hydraulic motor, PTO (Power Take Off). As the tongue moves, the unit 50 is pulled side to side and creates the wave planting method 33.

Figure 4:
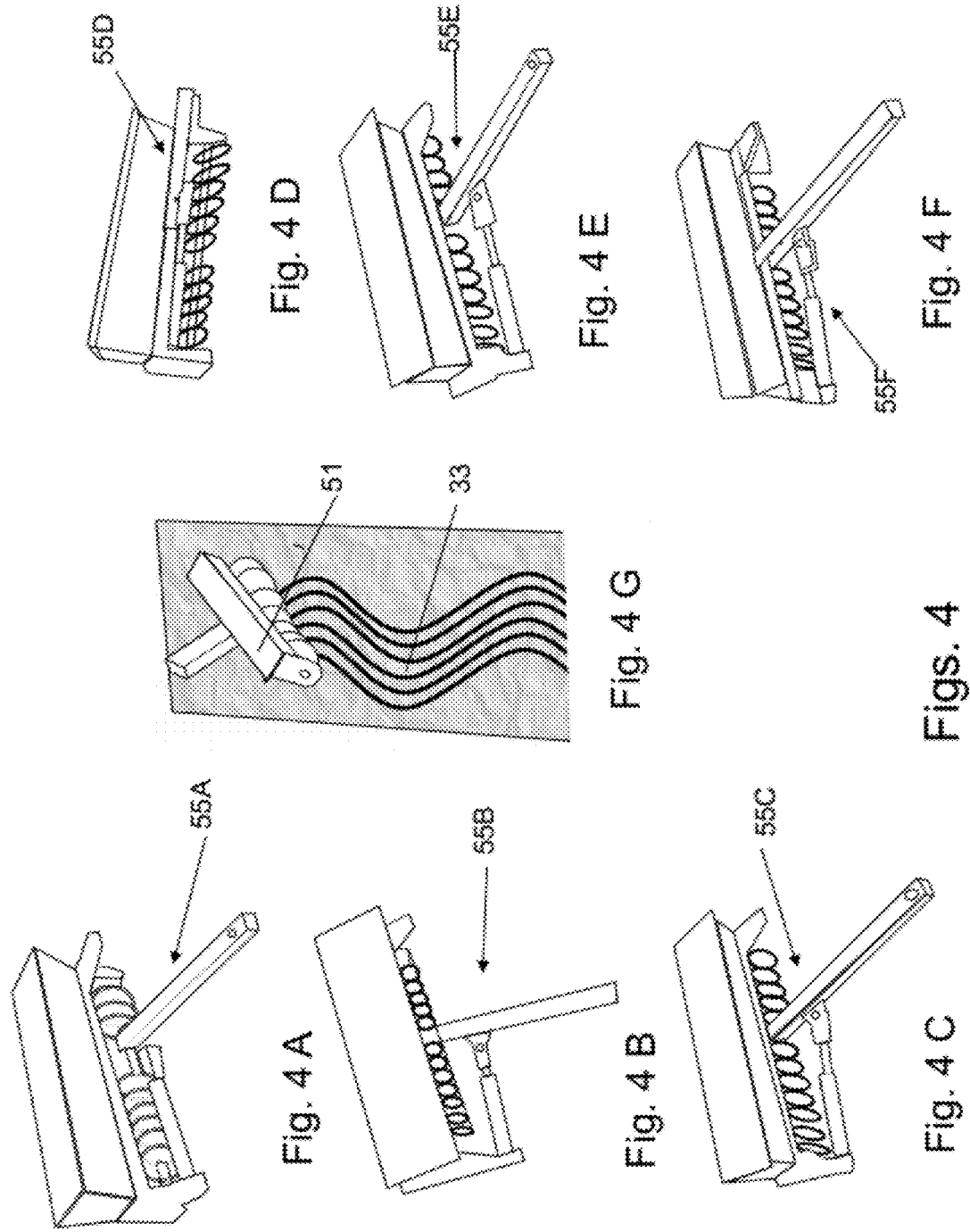
FIGS. 4 A through 4 F are operational steps in using the oscillating tongue device to permit wave planting.

FIGS. 4 A through 4 F are operational steps 55A through 55F in using the oscillating tongue device 50 to permit wave planting 31. FIG. 4 G is an example of the wave planting results 33. One notes the model device 51 in the picture.

FIGS. 5 A through 5 F are various simulated steps 57A through F in using the model oscillating tongue model device 51 behind a pulling force 81 to permit oscillating wave planting 33.

Figure 6:
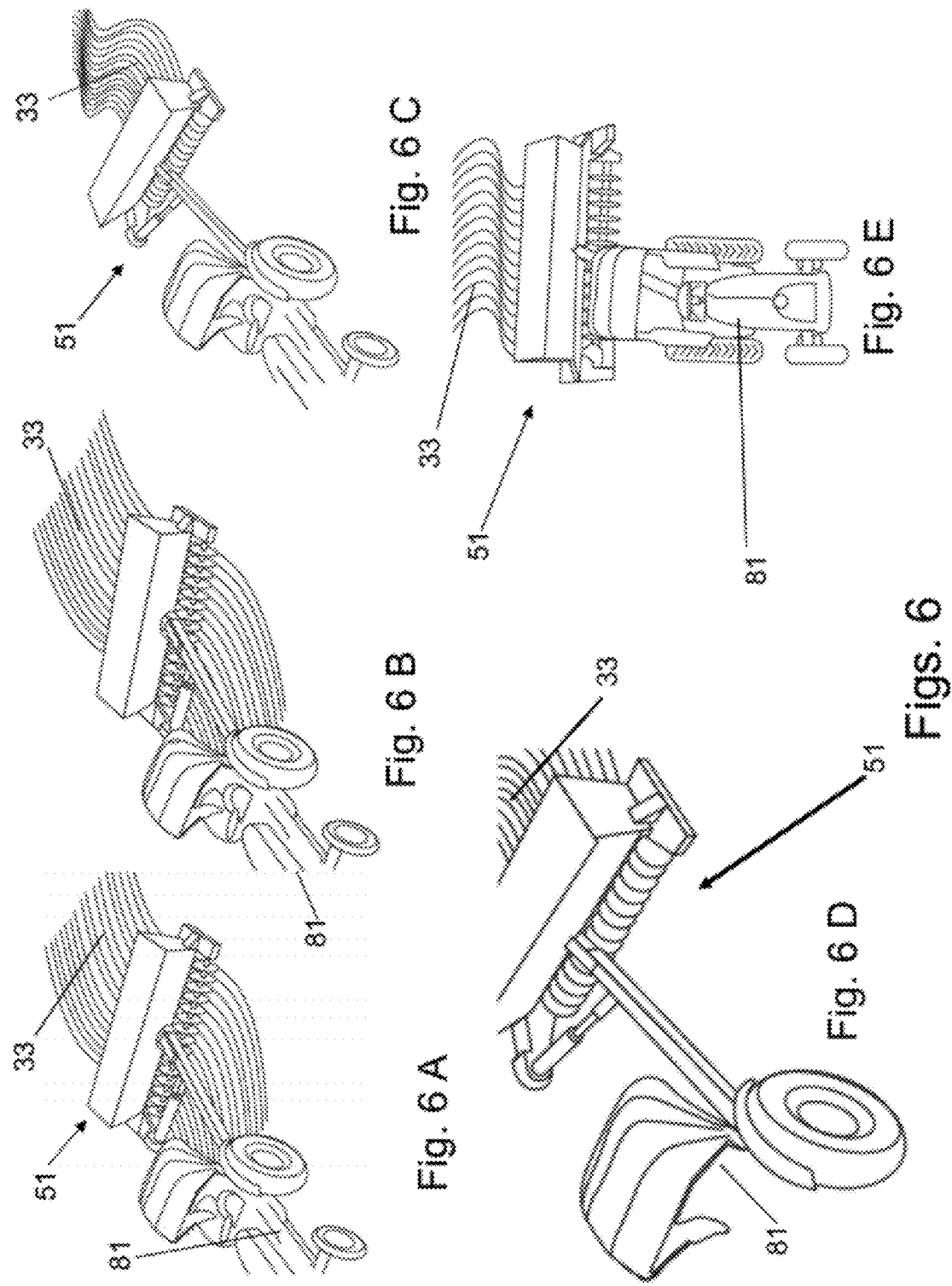
FIGS. 6 A through 6 E are additional simulated steps in using the model oscillating tongue device behind a pulling force to permit oscillating wave planting.
Figure 9:
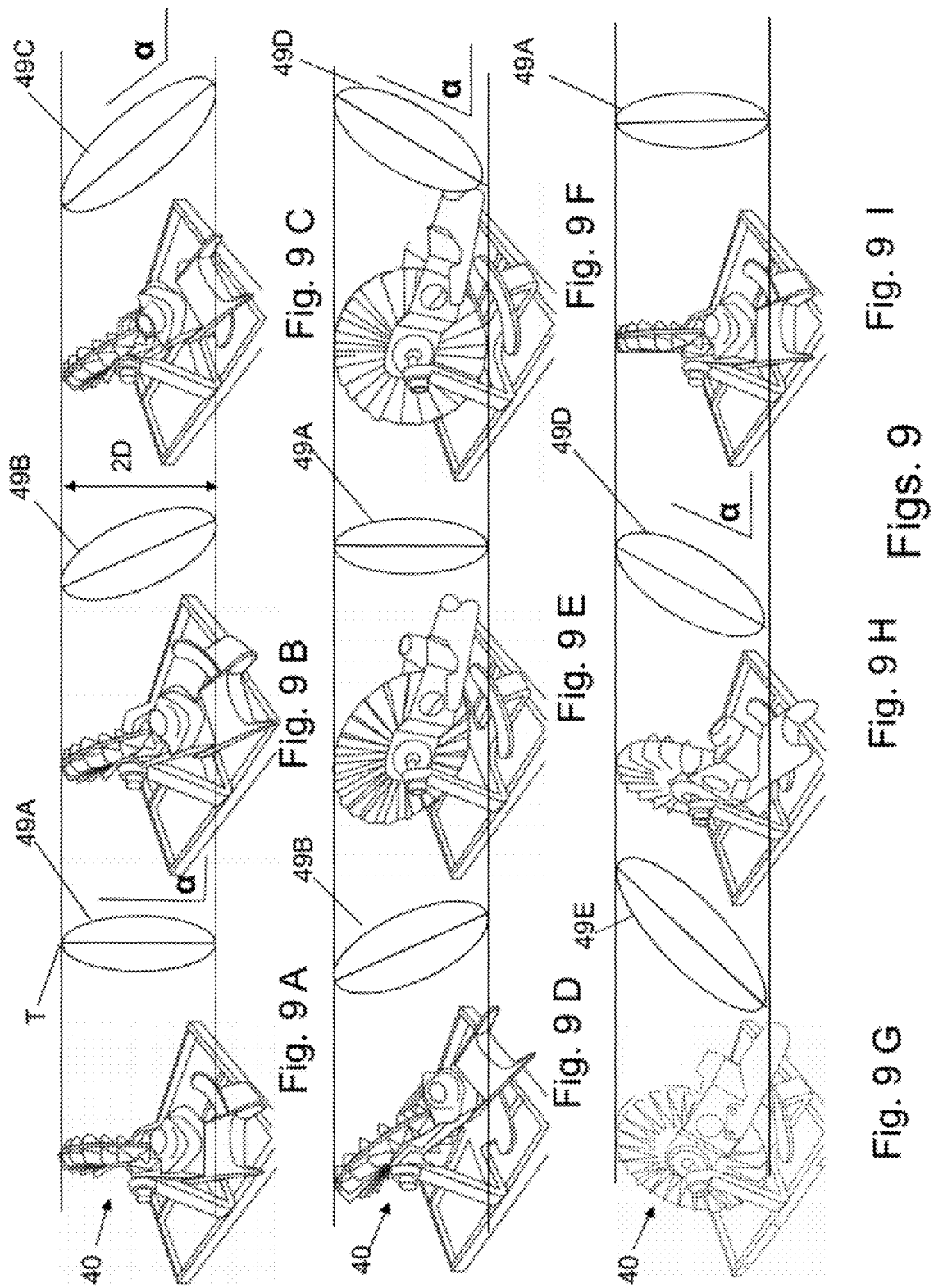
FIG. 9 A through 9 I are sketches of the model elliptical planter at different times and angles as it cycles through one revolution of the device.

FIGS. 6, 8 and 9 are primarily operational may be seen below.

Figure 7:
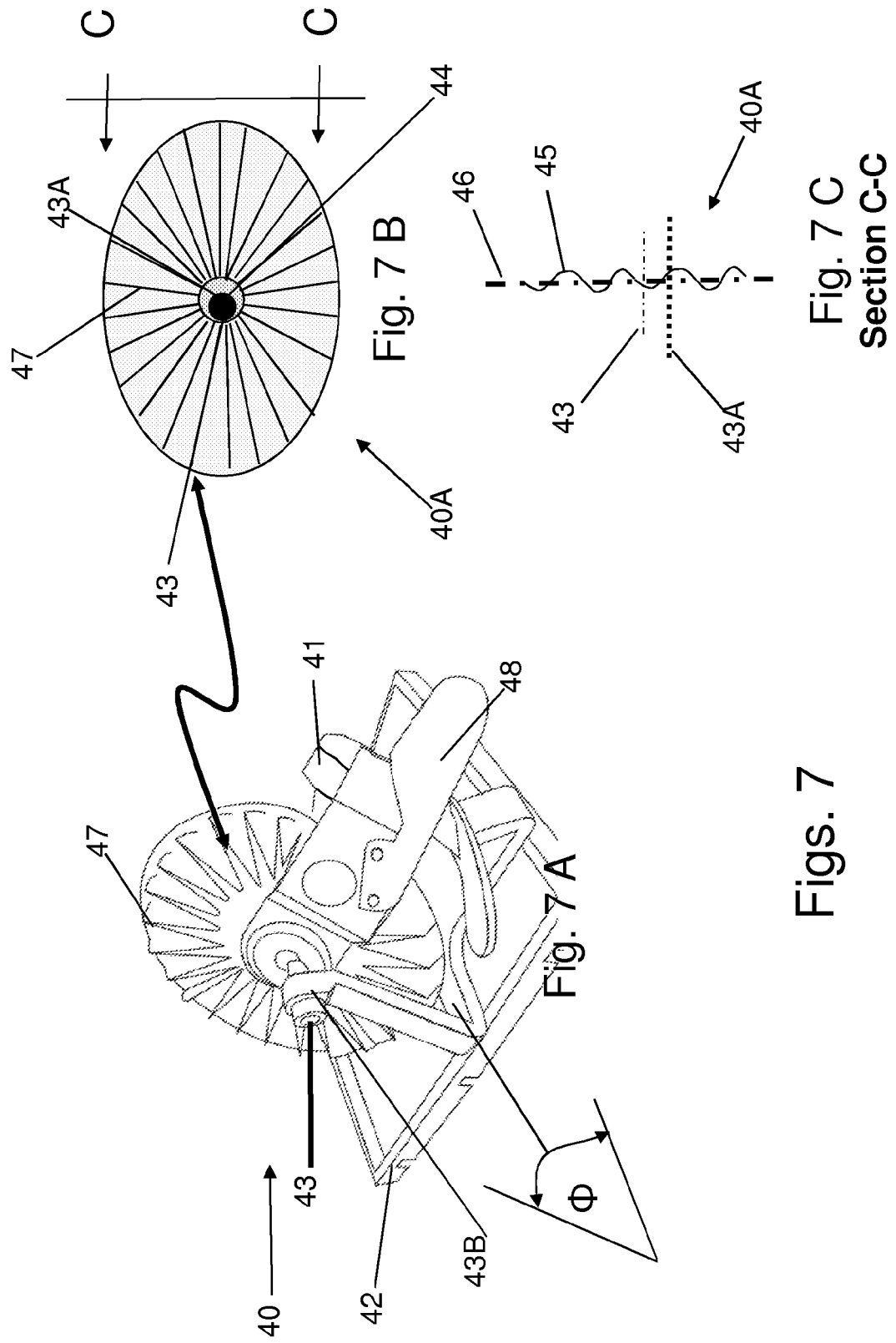
FIGS. 7 A through 7 C are sketches of a model of an elliptical disc device used to achieve wave planting.

FIGS. 7 A through 7 C are sketches of a model of an elliptical disc device 40 used to achieve wave planting 31. This elliptical row opener device 40 has been designed for the specific use in planting seeds in a serpentine row 31. This device shall deposit seeds with the correct/equal spacing according to it's requirements, corn, beans, wheat, oats, rye, etc. The rows shall be parallel to each other. The advantage of a planter 40 with serpentine wave planting 31 capability will be higher production from the same acreage compared to a conventional straight line planter 80. The higher production will be determined by the wave length or frequency of the serpentine/wave planted row in the soil. This frequency of planting is set at a given constant, say 4 inches, like a straight row planter 80. The distance that the row opener 40 travels is determined by the angle to the frame Φ, the length of the ellipse major and minor axis determined in part by the angle of the ellipse. In FIGS. 7 A through 7 C, the parts of the elliptical planter 40 are described. A model planter 40 is shown with the seed chute 41 the simulated frame 42, the splines 47, a cover means 48 and a mounting shaft 43. These are similar to a round disk row opener 80 yet with angles and diameters at differing configurations. One notes the aperture 44 in the disk plane 46 and that the ellipse center 43A of the elliptical plane 46 is eccentric to the shaft 43 (distance from 43 to 43A). A practical application anticipates the spline feature to be a stamped or manufactured wave structure 45.

Figure 10:
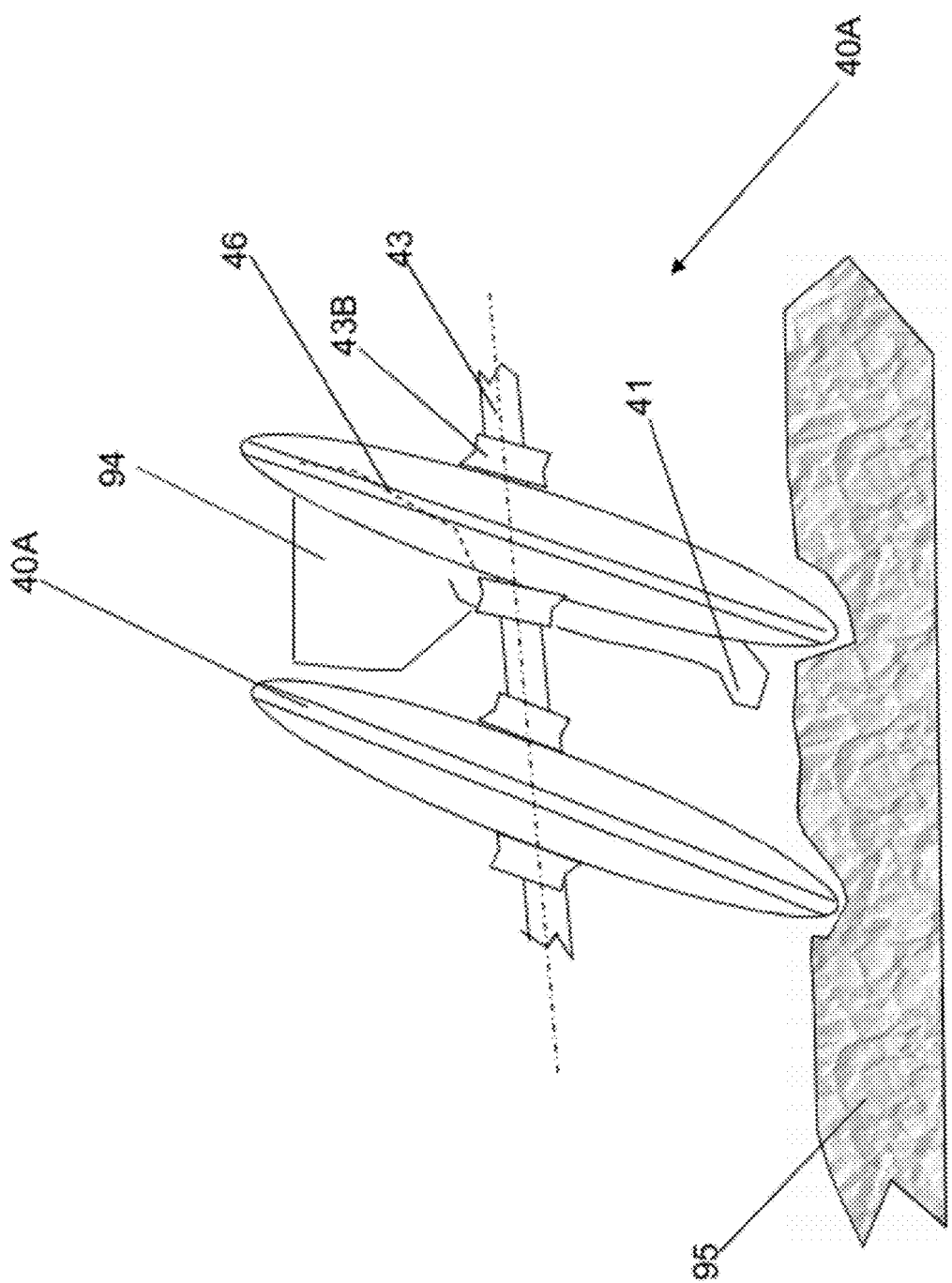
FIG. 10 are sketches/drawings of original elliptical disc concept.

FIG. 10 are sketches/drawings 40A of original elliptical disc 40 concept. The components are similar to those described above in FIG. 7.

FIGS. 11 A through 11 C are prototype sketches of straight disc 80 and elliptical disc 40 row openers. These were among the analysis tools used to confirm the patterns and results of the new wave planting methods 31,33.

FIGS. 12 A through 12 C example results for straight disc planters 80 and elliptical disc planters 40. Note the uniform spacing for the straight rows 32 and the spacing for the wave planters 31. The length of the row for the wave method 31 is significantly longer and provides opportunity for more seed per row and per acre. This is discussed and exemplified below.

FIGS. 13 A through 13 D are sketches of the steerable undercarriage wave planting device 60. This planter 60 is designed to sow seed also in a wave fashion 33 or conventional straight fashion 32 line series of rows. This will be achieved by towing a device 60 that attaches to a tractor 81 by using parallel towing bars 61 that will keep the device 60 parallel to the mounting bracket 61 attached to the tractor 67. The main wheels of this device will be steerable 62, 62B and operate through the use of a hydraulic actuator or other means to steer the device in such a way as to create a wave footprint 33 in the soil while planting seed. By using an on board computer or ground driven device the frequency of oscillation can be altered from straight line 32 to a wave pattern 33 as required for a particular application. A second set of castor wheels 65, 65B will be attached to the planter 60 for lifting at the end of a row allowing the device to be turned 180 degrees for the next series of rows. When the wheels 65B are in the raised position the device 60 will be controlled by the steerable wheels 62, 62B and when the castor wheels 65 are lowered the device will be allowed to turn by raising the steerable wheels 62, 62B off the ground. Planting will be achieved by using a series of castor type row openers 93 that move in harmony with the steerable wheels 65, 65B, there is an alternative to having a second set of wheels for turning however. By using the main carriage wheels in a way that would lift the device at the row end and would go into a "castor mode" and at the same time neutralize the steering actuator device. When the planter 60 has completed the turn and lowered the steering would be activated to continue planting.

FIGS. 14 A through 14 C are concept sketches of the steerable undercarriage wave planting device 60. The components are the same as discussed for FIG. 13. One notes the steered wheels 62, 62B in the FIGS. 14 A and B.

Figure 15:
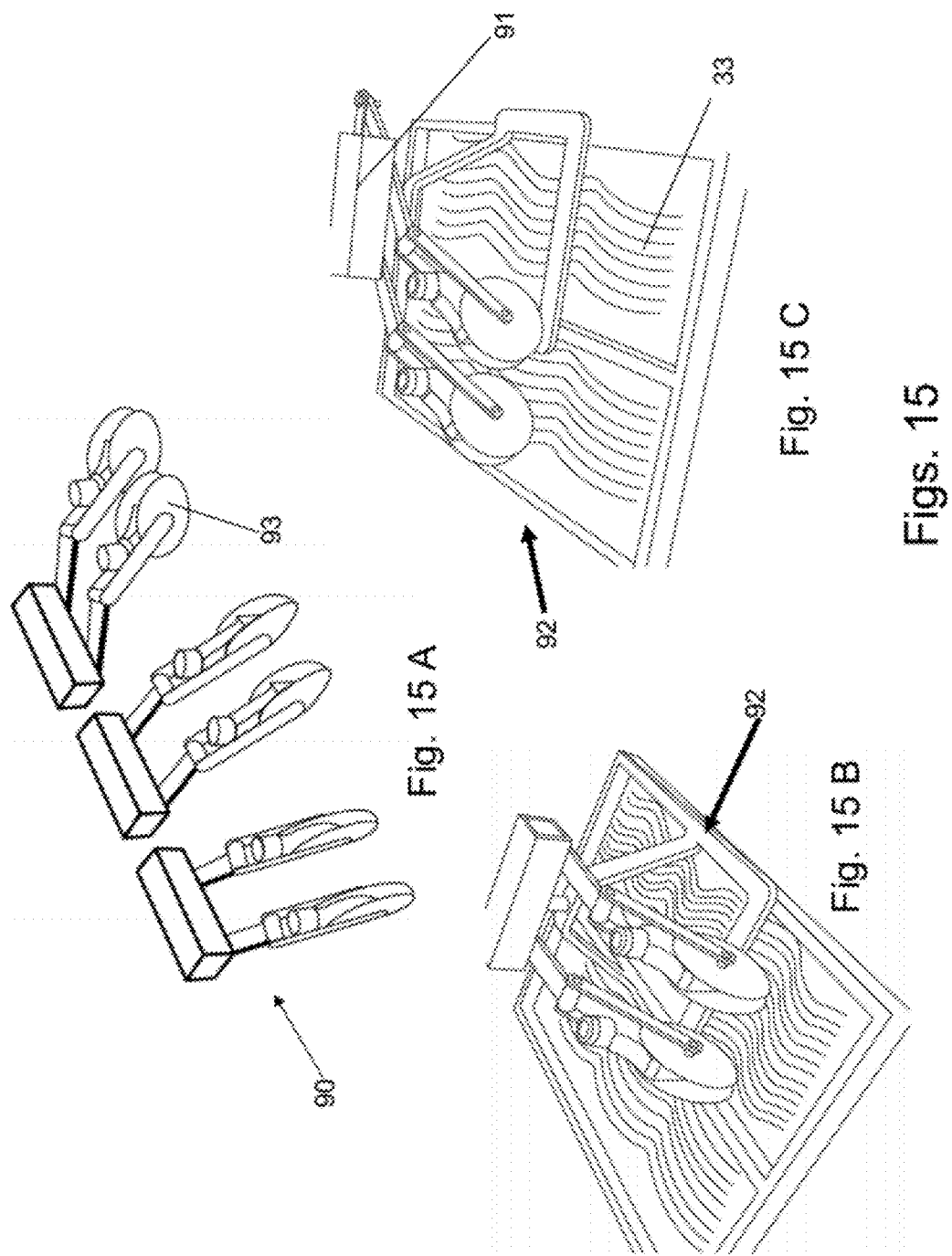
FIGS. 15 A through 15 C are sketches and models of an oscillating wave planter with castor type row openers.

FIGS. 15 A through 15 C are sketches and models of an oscillating wave planter 90 with castor type row openers 93. This device 90 would be similar to the steerable version 60 yet would not require the steering option. The Wheels 65 would be used to lift the device and would not be steerable. The wave footprint 33 would be achieved by the entire planting mechanism oscillating independently from the under carriage. parallel tow bars 61 are not required because the device would attach directly to the tractor drawbar. This planter would also be capable of wave or straight line planting. One notes the prototype 92, the castor row openers 93, and the main frame 91.

Figure 16:
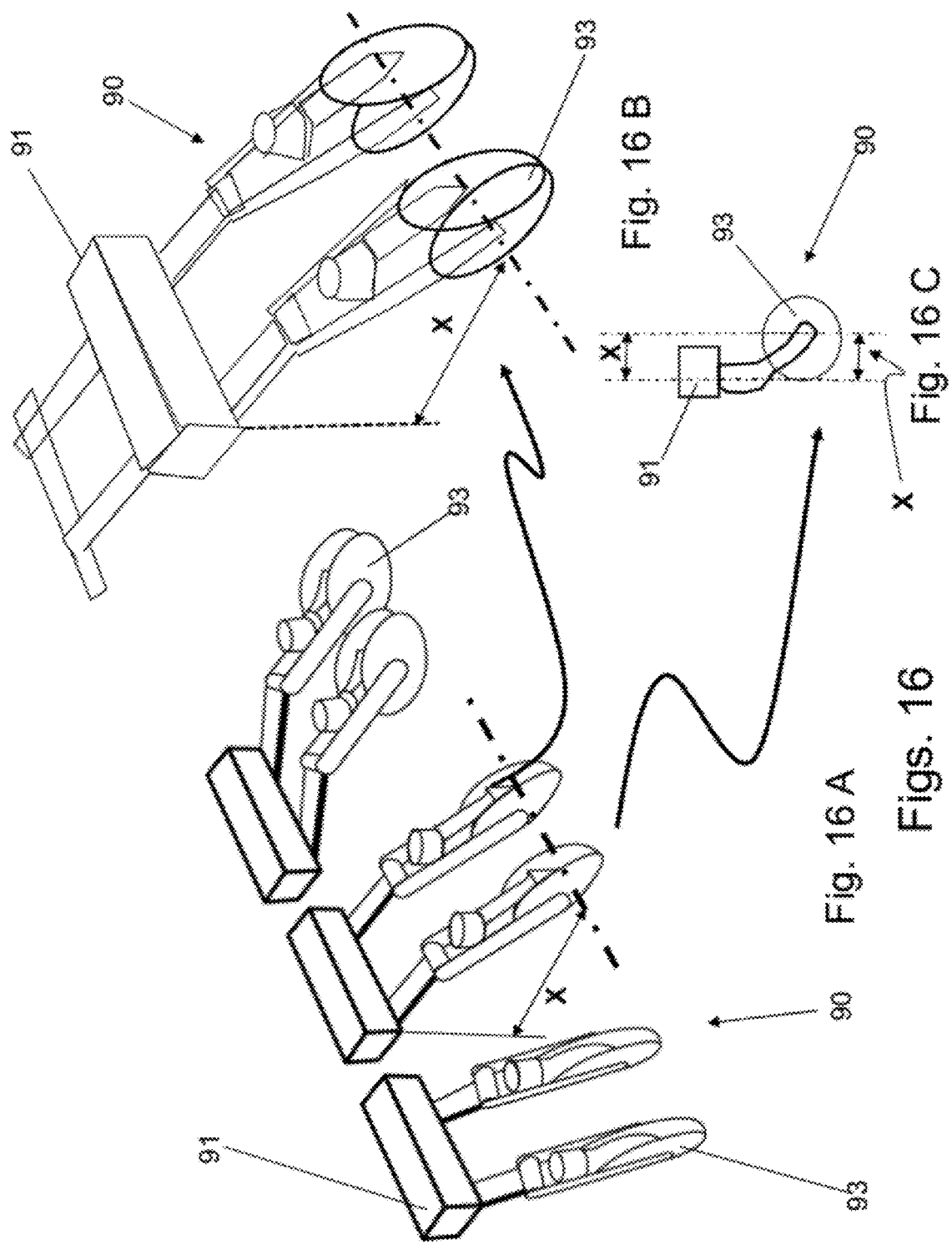
FIGS. 16 A through 16 C are concept sketches of an oscillating wave planter with castor type row openers.

FIGS. 16 A through 16 C are concept sketches of an oscillating wave planter 90 with castor type row openers 93. Other components are like those in FIG. 15.

FIGS. 17 A through 17 D are simulations of the planting results from a straight row opener 80, oscillating 51 and elliptical row opener 40 planting devices. These comparison sketches show the straight row pattern 32 and the wave patterns 31,33 of the devices described above.

FIGS. 18 A through 18 C are sketches of a tractor 81 from a front and rear 84 views for reference to current art. The rear view 84 allows one to easily see the ability to practically connect these various devices to current model vehicles and pulling means such as a tractor 81.

All of the details mentioned here are exemplary and not limiting. Materials used to create the various row openers and parts described above are not limited to traditional materials. However, there are currently metals (steel and steel alloys, iron, plastics, composite materials, synthetic materials, rubber and the like that are readily available to machine, cast, form or fabricate the above devices. It is anticipated that other durable and lightweight materials may be used as they are developed in the making of these and similar devices for the use in wave planting methods in the farming industry. Other components specific to describing a Controlled Spacing, High Density "Serpentine" Wave Planting Method; example devices to accomplish the method; and farming business methods may be added as a person having ordinary skill in the field of the farming industry and related equipment and methods well appreciates.

OPERATION OF THE PREFERRED EMBODIMENT

The wave method and devices are described above. FIGS. 4, 5, 6, 8, 9, 12, 15 and 17 describe more of the operation and are discussed further below.

FIGS. 4 A through 4 F are operational steps 55A through 55F in using the oscillating tongue device 50 to permit wave planting 31, 33. FIG. 4 G is an example of the wave planting results 33. One notes the model device 51 in the picture. The general device 50 moves side to side as the means 54 is controlled and extends, thus moving the planter 51 from side to side.

FIGS. 5 A through 5 F are various simulated steps 57A through F in using the model oscillating tongue model device 51 behind a pulling force 81 to permit oscillating wave planting 33. The wave pattern 33 is slightly different than the one created by the elliptical means 40 since the turning is not as exact between the cylindrical motion 50, 70 versus the tangential point of the elliptical row opener 40. There is still a significant increase in seed density.

FIGS. 6 A through 6 E are additional simulated steps similar to those described in FIG. 5 in using the model oscillating tongue model device 51 behind a pulling force 81 to permit oscillating wave planting 33.

FIGS. 8 A and 8 B are sketches of the elliptical disc planter 40A and the change of the elliptical disc plane 46. The movement 49 of the tangent T as well as the major M1 and minor axes M2 are shown in the sketches. One notes that the height D of the shaft 43 remains essentially constant. The overall movement of the tangential point T provides a footprint with a much longer distance since the circumference of the elliptical row opener 40 is longer than a standard round row opener 80.

FIG. 9 A through 9 I are sketches of the elliptical planter 40 at different times and angles α as it cycles through one revolution of the device. The distance from the tangent T at ground intersection remains a constant 2D from the frame plane. As the device turns, the major axis M1 causes the planter 40 to extend out, but the angle α Also changes in order to keep the shaft height D constant above the ground. As the row opener 40 turns, a longer circumference of the ellipse is transcended and hence a larger distance for dropping seed. Since the axis and angle both move, a wave pattern 31 results.

FIGS. 8 and 9 provide a phenomena of a longer circumference with more places to plant seeds—yet keep them spaced at an equal distance. This is summarized as Seed deposit comparison for a conventional planter and three angular ellipses. For the Conventional straight line planter 80 leaving a straight row foot print 32, by using a 12" diameter round row opener with a circumference of 37.699" and a seed deposit rate of one seed every 4" the planter 80 will plant 9.42 seeds per revolution. It will require 66 revolutions to travel 208' which is the length of one side of a square acre plus or minus. At this rate it will deposit 621.72 seeds per row. With the rows being 7" on center, there will be 356 rows per acre and total seed deposit of 221,076 seeds per acre. For a planter with elliptical row openers 40, one must decide the ratios of the Major axis to minor axis. The range is infinite but one can see the pattern by looking at three examples (and not limitations). By using a 60 degree elliptical disc with a minor axis of 12" and a major axis of 13.68", the foot print in the soil would be 40.32" per revolution. Based on the same seed deposit of every 4" this device would deposit 1008 seeds per revolution or 665.28 seeds per row for a total of 236,839 per acre. This is an increase of 7 percent over the conventional straight line planter 80. By using a 45 degree elliptical disc row opener with a minor axis of 12" and a major axis of 16.44" the foot print in the soil would be 44.64" per revolution. Based on the same seed deposit of every 4" this device would deposit 11.16 seeds per revolution or 736.56 seeds per row for a total of 262215 per acre based on 356 rows per acre. This is an increase of 19 percent over the conventional straight planter 80. Using a 30 degree elliptical disc row opener with a minor axis of 12" and a major axis of 23.28" the foot print in the soil would be 55.32" per revolution or 13.86 seeds per revolution. Based on 66 revolutions per row for 356 rows per acre the total seed deposit would be 324,949 seeds per acre this would be an increase of 47 percent over the conventional straight line planter 80. The seed numbers are based on 4" spacing of seeds in 7" rows that are 208' long and 356 rows required per acre each acre measuring 208'×208' the row spacing could be 18"~24"~30"etc. The percentage of increase would remain the same, it all has to do with a longer row in the same space. The other planting methods we discussed would all have similar numbers relatively an increase in crop production. This is summarized in a Table D as:

TABLE D

SEED DEPOSIT COMPARISON

| ITEM | DESCRIPTION | MINOR IN | MAJOR IN | CIRCUM IN | SEED PER REV @ 4 IN SEED DROP | REV PER 208 FT | SEEDS PER 208 FT | ROWS ON 7 INCH CTR FOR ACRE | SEEDS PER ACRE | PERCENT INCREASE OVER STRAIGHT |
|---|---|---|---|---|---|---|---|---|---|---|
| 1 | CONVENTIONAL ROUND ROW OPENER | 12.00 | 12.00 | 37.70 | 9.42 | 66 | 621.72 | 356.57 | 221686.70 | |
| 2 | 60 DEGREE ELLIPSE | 12.00 | 13.68 | 40.32 | 10.08 | 66 | 665.28 | 356.57 | 237218.89 | 7.01% |
| 3 | 45 DEGREE ELLIPSE | 12.00 | 16.44 | 44.64 | 11.16 | 66 | 736.56 | 356.57 | 262635.20 | 18.47% |
| 4 | 30 DEGREE ELLIPSE | 12.00 | 23.28 | 55.32 | 13.83 | 66 | 912.78 | 356.57 | 325469.96 | 46.82% |

FIGS. 12 A through 12 C example results for straight disc planters 80 and elliptical disc planters 40. Note the uniform spacing for the straight rows 32 and the spacing for the wave planters 31. The length of the row for the wave method 31 is significantly longer and provides opportunity for more seed per row and per acre. This is shown in the Table D, above.

FIGS. 15 A through 15 C are sketches and models of an oscillating wave planter 92 with castor type row openers 93. One notes the wave pattern 33 resulting in the models use.

FIGS. 17 A through 17 D are simulations of the planting results from a straight row opener 80, oscillating 51 and elliptical row opener 40 planting devices. These comparison sketches show the straight row pattern 32 and the wave patterns 31, 33 of the devices described above. The wave patterns have significantly more circumference and result in the additional seed density shown in Table D, above.

With the above description it is to be understood that Controlled Spacing, High Density "Serpentine" Wave Planting Method; example devices to accomplish the method; and farming business methods are not to be limited to only the disclosed embodiments. The features of methods and devices are intended to cover various modifications and equivalent arrangements included within the spirit and scope of the descriptions.

What is claimed is:

1. A wave planter device for drilling seeds comprised of
   (a) a drawbar;
   (b) a means to produce lateral movement of the draw bar comprised of at least one cylinder and a control system for the at least one cylinder;
   (c) a means to moveably secure the means to produce lateral movement to a pulling vehicle comprised of a tractor;
   (d) a moveable drawbar means for securing the at least one cylinder and the control system to the tractor;
   (e) at least one row opener secured essentially perpendicular to the drawbar; and
   (f) a means to connect the drawbar and the at least one row opener to the wave planter device wherein the waver planter device is used to pull the at least one row opener in a wave pattern and create a seed distribution which equally spaces the seeds to assure essentially equal nutrients, moisture and sunlight to the equally spaced seeds.

2. The device according to claim 1 wherein the means to produce lateral movement is an oscillating draw bar.

3. The device according to claim 1 wherein the means to produce lateral movement is an oscillating tongue planter.

4. The device according to claim 1 wherein the means to produce lateral movement is elliptical row opener planter.

5. The device according to claim 1 wherein the means to produce lateral movement is a steerable undercarriage for the planter.

6. The device according to claim 1 wherein the means to produce lateral movement is at least one castor row opener under an undercarriage.

* * * * *